(12) United States Patent
Gatherer et al.

(10) Patent No.: US 6,396,457 B1
(45) Date of Patent: May 28, 2002

(54) CONCENTRATOR FOR COUPLING LOCAL WIRELESS NETWORKS TO A WIRED NETWORK

(75) Inventors: Alan Gatherer; Mohammed Nafie, both of Richardson; Anand G. Dabak, Plano; Carl M. Panasik, Garland; Michael L. McMahan, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/727,863

(22) Filed: Nov. 30, 2000

Related U.S. Application Data

(60) Provisional application No. 60/185,783, filed on Feb. 29, 2000.

(51) Int. Cl.[7] ............................................... H01Q 21/00
(52) U.S. Cl. ...................... 343/853; 343/824; 343/893
(58) Field of Search ................................. 343/725, 729, 343/751, 824, 850, 853, 893

(56) References Cited

U.S. PATENT DOCUMENTS

| | | | | |
|---|---|---|---|---|
| 4,789,983 A | * | 12/1988 | Acampora et al. .......... 370/333 |
| 5,657,325 A | * | 8/1997 | Lou et al. .................... 370/334 |
| 5,754,957 A | * | 5/1998 | Khan .......................... 370/331 |
| 5,812,951 A | * | 9/1998 | Ganesan et al. ............ 370/314 |
| 6,023,241 A | * | 2/2000 | Clapper ................... 342/357.06 |
| 6,078,815 A | * | 6/2000 | Edwards ..................... 455/422 |
| 6,226,508 B1 | * | 5/2001 | Takahashi et al. .......... 375/267 |

OTHER PUBLICATIONS

"Networks for Homes", Amitava Dutta–Roy, Contributing Editor, IEEE Spectrum, 12/99, pp. 26–33.

* cited by examiner

*Primary Examiner*—Don Wong
*Assistant Examiner*—Shih-Chao Chen
(74) *Attorney, Agent, or Firm*—Ronald O. Neerings; Wade J. Brady, III; Frederick J. Telecky, Jr.

(57) ABSTRACT

A concentrator (11) coupled to a wired network (13) also acts as a master device relative to each of a plurality of ad hoc wireless communication networks (15), thereby permitting wireless communication devices in the ad hoc networks to access the wired network. The concentrator utilizes antenna array processing and beamforming techniques when communicating with the devices of the various networks, in order to advantageously reduce communication interference between the networks.

20 Claims, 4 Drawing Sheets

CONCENTRATOR FOR COUPLING LOCAL WIRELESS NETWORKS TO A WIRED NETWORK

This application claims the priority under 35 U.S.C. 119(e)(1) of copending U.S. provisional application No. 60/185,783, filed on Feb. 29, 2000.

FIELD OF THE INVENTION

The invention relates generally to wireless communications and, more particularly, to the connection of local wireless communication networks to a wired network.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. Dec. 26, 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a 10th century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and a maximum asymmetric data transfer rate of 723 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Frequency hopping permits operation in noisy environments and permits multiple piconets to exist in close proximity. The frequency hopping scheme permits up to 1600 hops per second over 79 1-MHZ channels or the entire 2.4 GHz ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

In some known communication systems, a plurality of Bluetooth devices, for example a plurality of Bluetooth master devices, are utilized to provide to their respective Bluetooth piconets wireless access to a wired network, for example a LAN. In such known systems, each of the Bluetooth master devices is wireline-coupled to the wired network. However, in areas where there is a high concentration of piconets, for example a large conference room or a cubicle farm, wireless communications within a given piconet can disadvantageously interfere with wireless communications in one or more neighboring piconets. Such interference disadvantageously prevents full utilization of the aggregate communication capacity provided by the concentrated plurality of piconets.

It is therefore desirable to provide improved utilization of the aggregate communication capacity provided by a concentrated plurality of local wireless communication networks, for example Bluetooth piconets.

According to the invention, a concentrator coupled to a wired network also acts as a master device relative to each of a plurality of ad hoc wireless communication networks, thereby permitting wireless communication devices in the ad hoc networks to access the wired network. The concentrator utilizes antenna array processing and beamforming techniques when communicating with the devices of the various ad hoc networks. This advantageously reduces communication interference between the ad hoc networks, thereby increasing the utilization of the aggregate communication capacity provided by the ad hoc networks and decreasing power requirements for the devices in the ad hoc networks.

DETAILED DESCRIPTION

Figure 1:
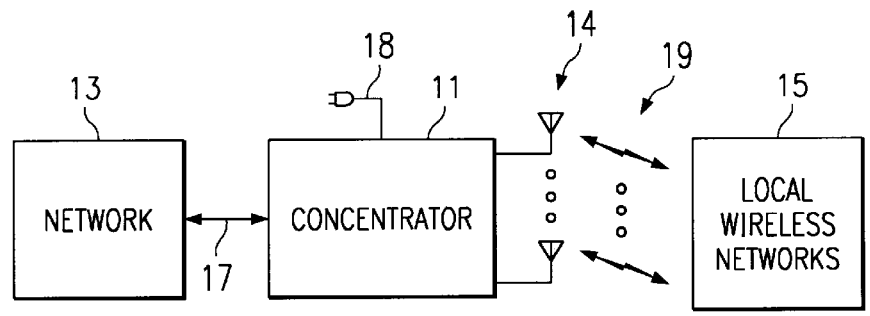
FIG. 1 diagrammatically illustrates pertinent portions of a communication system according to the invention.

FIG. 1 diagrammatically illustrates a communication system according to the present invention. The system of FIG. 1 includes a concentrator 11 connectable at 18 to a power supply main (such as an AC power supply main). The concentrator 11 includes an antenna array with a plurality of antennas 14 which communicate with a plurality of local wireless communication networks 15 via wireless communication links illustrated generally at 19. The concentrator 11 also has a communication port connected to a wired network 13 (e.g., ethernet) via a wireline connection 17, and the concentrator can have its own address in network 13. The concentrator 11 can communicate bidirectionally with the network 13 via the communication port and wireline connection 17, and can also communicate bidirectionally with the local wireless communication networks 15 via the wireless communication links 19, thereby permitting wireless communication devices in the networks 15 to access the wired network 13.

In some exemplary embodiments of the invention, the local wireless communication networks 15 can be conventional Bluetooth piconets and the wireless communication links at 19 can be conventional Bluetooth radio links. The piconets at 15 can each include ad hoc collections of Bluetooth slave devices, while the concentrator 11 functions as the Bluetooth master device for each of the ad hoc piconets at 15. In general, each slave device in a Bluetooth piconet transmits only after receiving a transmission from the master device, and the master device transmits to each slave device on a periodic basis.

Figure 2:
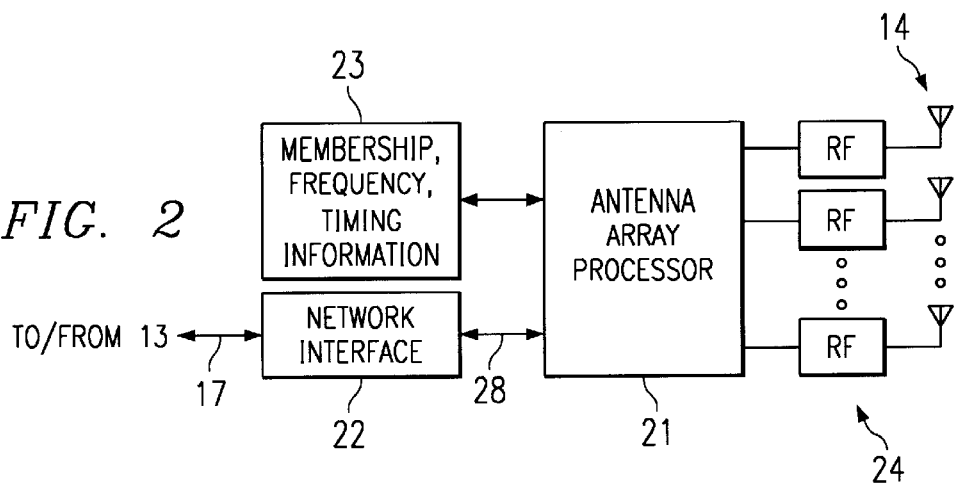
FIG. 2 diagrammatically illustrates pertinent portions of exemplary embodiments of the concentrator of FIG. 1.

FIG. 2 diagrammatically illustrates pertinent portions of exemplary embodiments of the concentrator 11 of FIG. 1. In FIG. 2, the antennas 14 are coupled to an antenna array processor 21 by respective RF front end sections 24, for example conventional Bluetooth RF front end sections, or any RF front end sections capable of converting between an RF frequency and a suitable IF frequency. The antenna array processor 21 is also coupled at 28 to a network interface 22 which can use conventional techniques to interface between the communication signals of the antenna array processor 21 and the communication signals of the wired network 13. The antenna array processor 21 is also coupled to a wireless communication interface controller 23. The controller 23 maintains therein information such as the members of the various piconets 15, and the frequency/time slot combinations associated with communications to and from the members of the various piconets. In Bluetooth embodiments, the controller 23 can also cooperate with the antenna array processor 21 to implement the master behavior exhibited by the concentrator 11 in each of the piconets 15.

The antenna array processor 21 can utilize conventional antenna array (AA) processing and beamforming techniques to control the antennas 14 appropriately for communication with the networks 15 (see also FIG. 1) so as to avoid interference between communications involving wireless communication devices in respective networks 15, for example, networks which neighbor one another.

Figure 3:
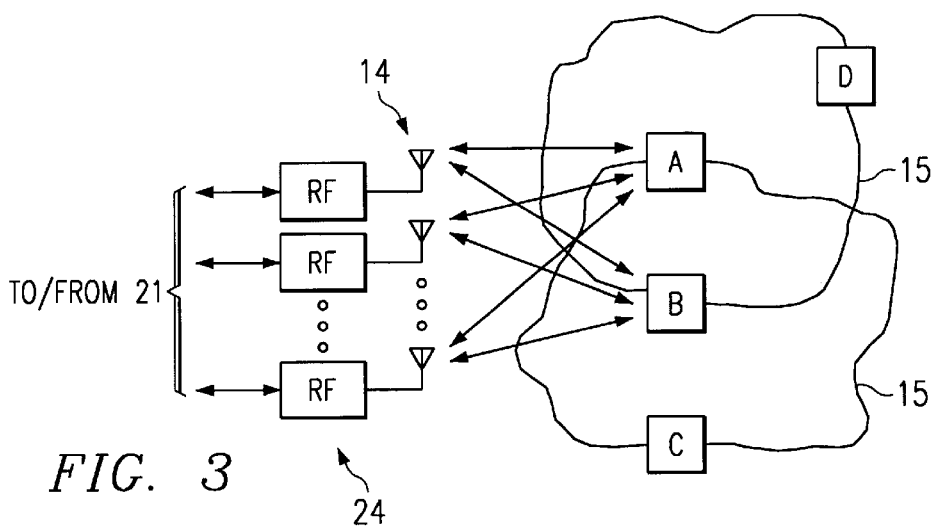
FIG. 3 diagrammatically illustrates exemplary communications which can be controlled by the antenna array processor 21 of FIG. 2.

FIG. 3 diagrammatically illustrates an example of how the antenna array processor 21 of FIG. 2 can use AA processing to avoid interference between communications with devices A and B in respective neighboring networks 15. Assuming, for purposes of example, that respective communications are to be transmitted to (or received from) wireless communication devices A and B on the same frequency, call it f1, and during the same time slot. Referring also to FIG. 2, the controller 23 can communicate such a timing and frequency conflict to the antenna array processor 21, which can then utilize the antennas 14 in the exemplary manner illustrated in FIG. 3.

Based on earlier transmissions received by the various antennas 14 from the devices A and B on the conflicting frequency f1 (and possibly on other neighboring frequencies), the antenna array processor 21 uses conventional techniques to evaluate the frequency f1 channels from each of the antennas 14 to each of the devices A and B. Based on this channel quality information for frequency f1, the antenna array processor 21 uses conventional AA processing and beamforming techniques to transmit to (or receive from) device A the desired communication using a group of the antennas 14. Similarly, the antenna array processor 21 uses conventional AA processing and beamforming techniques to transmit to (or receive from) device B the desired communication using a group of the antennas 14. In this example, the antenna group used for device B is the same as used for device A, but the groups selected by the antenna array processor 21 for devices A and B can differ as conditions require.

The AA processing and associated beamforming advantageously causes those communication signals directed to device A to be coherently combined at device A and substantially cancelled or nulled at device B, and causes the communication signals directed to device B to be coherently combined at device B and substantially cancelled or nulled at device A. Because of the above-described coherent combination and signal cancellation, interference between the communication directed to device A and the communication directed to device B can be substantially eliminated, despite the fact that both devices receive their respective communications on the same frequency during the same time slot. In Bluetooth embodiments, the concentrator, as master of all piconets, receives transmissions from each piconet member periodically, thus advantageously facilitating the frequency channel quality evaluations. Any given slave device can also make frequency channel quality measurements on transmissions that it receives from the concentrator, and can report these measurements to the concentrator. Due to reciprocity in the channel, these measurements made by the slave device can be used by the concentrator to improve the concentrator's transmit and receive performance. Exemplary conventionally available indicators of frequency channel quality include SNR, RSSI and Bluetooth sync word correlation values. These indicators can, for example, be used to determine weighting vectors for the antenna beamforming operations.

For communications received from devices A and B on frequency f1 during the same time slot, AA processing and beamforming similarly permit the concentrator 11 to use groups of the antennas 14 to effectively separate the respective signals received from devices A and B.

In some embodiments, some or all of the RF sections 24 can be wideband RF sections, each capable of transmitting/receiving on more than one frequency simultaneously. If, for example, during a given time slot, the concentrator is scheduled to transmit to (or receive from) devices A and B (see FIG. 3) on frequency f1 while also using another frequency f2 to transmit to (or receive from) a third device in a third network 15 (not specifically shown in FIG. 3), the antenna array processor 21 can apply AA processing and beamforming techniques with respect to any antennas 14 which have wideband RF sections, such that these antennas can advantageously transmit (or receive) on both frequency f1 and f2. Such use of wideband RF sections and their corresponding antennas advantageously permits each remote device to communicate with all of the wideband RF sections, which maximizes the antenna gain seen by the remote devices. This maximized antenna gain permits the remote devices to transmit at a lower power level. This lower power level can extend the battery life of the remote devices, and also makes the remote devices less of an interferer with, for example, IEEE 802.11 or other 2.4 GHz band equipment. The use of multiple wideband RF sections to transmit from the concentrator provides improved antenna gain in the beamforming operation, thereby requiring less transmit power. Therefore, the concentrator's transmission is less of an interferer with other piconets or other 2.4 GHz band equipment.

Figure 4:
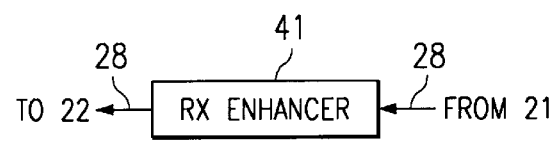
FIG. 4 diagrammatically illustrates pertinent portions of further exemplary embodiments of the concentrator of FIG. 1.

FIG. 4 diagrammatically illustrates further exemplary embodiments of the concentrator 11 of FIG. 1. According to FIG. 4, a receive (RX) enhancer 41 is inserted into the communication link 28 between the antenna array processor 21 and the network interface 22 (see also FIG. 2). The enhancer 41 can significantly decrease the required receive Eb/No (signal-to-noise ratio), thereby advantageously permitting increased receive range from the devices A, B, C and D in the networks 15 (see also FIG. 3). In some embodiments, the enhancer 41 can be a conventional decision feedback equalizer (DFE) apparatus. In other embodiments, the enhancer 41 can be a multi-user detector which employs conventional multi-user detection (MUD) techniques. The use of multi-user detection can, for example, aid in separating signals received from devices A and B on the same frequency at the same time, and can reduce the number of dropped packets in Bluetooth communications. A multi-user detector is also useful for suppressing signals that the concentrator 11 is not directly interested in, for example, unwanted IEEE 802.11 signals that exist in the same bandwidth as wanted Bluetooth signals.

Due to the aforementioned increased receive range from the devices A–D, some embodiments of the concentrator 11 use an increased level of transmission power in order to increase the transmit range to devices A–D. Because the concentrator 11 can be plugged into the power supply main at 18 (see FIG. 1), an increased transmission power level is easily accommodated. As one example, the Bluetooth specification requires a maximum power of 100 mW, which is well below the maximum allowed FCC power of 1 W. This means that, for example, a two-fold transmission range increase (e.g., to match the receive range increase provided by the enhancer 41), is easily achievable within FCC regulations.

Figure 5:
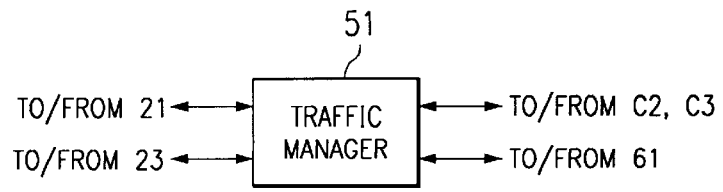
FIG. 5 diagrammatically illustrates pertinent portions of further exemplary embodiments of the concentrator of FIG. 1.

FIG. 5 diagrammatically illustrates further exemplary embodiments of the concentrator 11. According to FIG. 5, a traffic manager 51 can be coupled for bidirectional communication with the antenna array processor 21 and the wireless communication interface controller 23 (see also FIG. 2). The traffic manager 51 can also be coupled for bidirectional communication with one or more additional concentrators designated as C2 and C3 in FIG. 5, and/or can be coupled for bidirectional communication with a central concentrator controller designated at 61 in FIG. 5. The traffic manager 51 can monitor the communication traffic in the concentrator 11 and, if the monitored traffic is considered to be undesirably high, the traffic manager 51 can communicate with one or more neighboring concentrators (for example C2 or C3) to negotiate a hand-off of some devices to that neighboring concentrator. In addition, or alternatively, traffic information compiled by the traffic manager 51 can be provided to a central concentrator controller 61 and, when the traffic is considered to be undesirably high, the central controller 61 can negotiate for hand-off to one or more neighboring concentrators.

The above-described features of FIGS. 4 and 5 can be used together or separately in exemplary concentrator embodiments.

Figure 6:
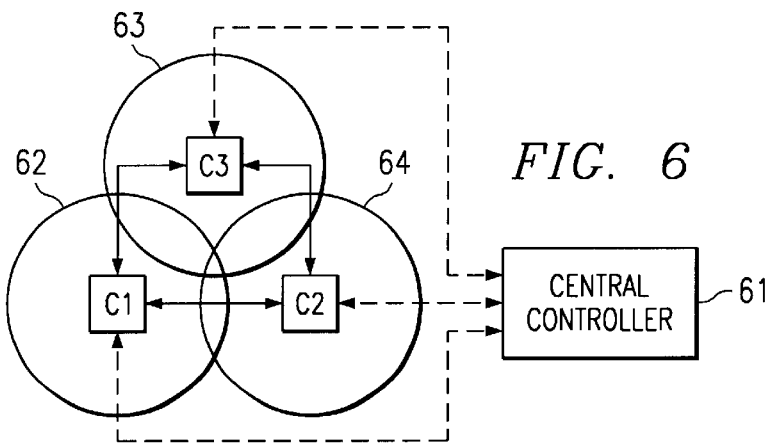
FIG. 6 diagrammatically illustrates an exemplary deployment of a plurality of concentrators according to the invention.

FIG. 6 diagrammatically illustrates an example of a plurality of concentrators C1–C3 and their respective coverage areas 62–64, which overlap with one another. For example, the concentrators C1–C3 can be deployed on one or more floors of a factory or office building. If concentrator C1 becomes too highly loaded with users operating in its coverage area 62, it can communicate with one or both of concentrators C2 and C3, either directly or via the central controller 61, and can, for example, hand-off to C2 and/or C3 some or all users in the associated coverage overlap areas, assuming C2 and/or C3 have available capacity.

Traffic loading information relative to the concentrators C1–C3 can also be used to determine whether any of the concentrators needs to be upgraded or downgraded according to the traffic load. This determination can be made by the concentrator itself, or by the central controller 61. For example, a high traffic load might indicate that the concentrator needs to be replaced by a more powerful concentrator having a higher traffic capacity, and an abnormally low traffic load might indicate that the concentrator can be replaced by a concentrator having a lower traffic capacity. In some instances, a high capacity concentrator currently operating in a low traffic area could be swapped with a low capacity concentrator currently operating in a high traffic area.

Figure 7:
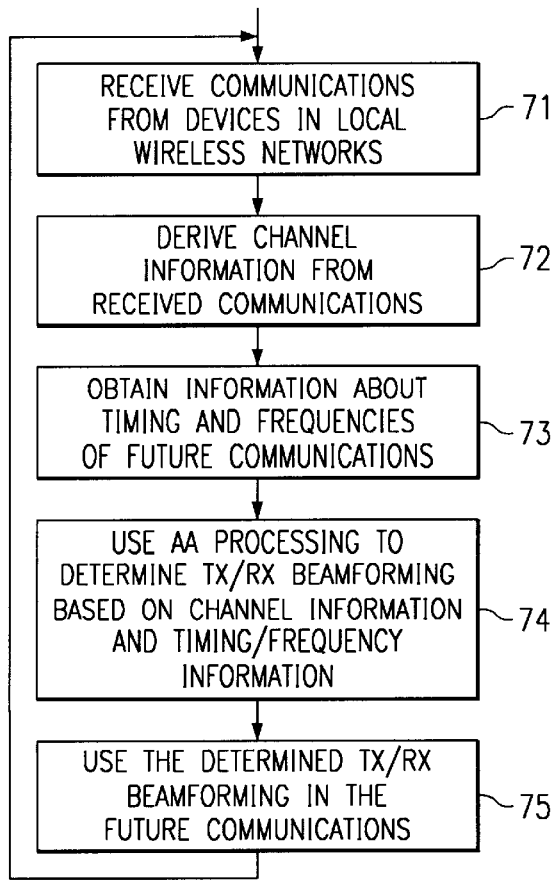
FIG. 7 illustrates exemplary operations which can be performed by concentrators according to the invention.

FIG. 7 illustrates exemplary operations which can be performed by the concentrator 11 according to the present invention. At 71 and 72, communications are received from various devices operating in the local wireless networks, and channel information, such as frequency channel quality, is derived from the received communications. After obtaining information about the timing and frequencies of future communications to the various devices at 73, AA processing is used at 74 to determine the transmit/receive (TX/RX) beamforming that should be used by the antenna array for the future communications, based on the channel information and the timing/frequency information. Thus, for example, when devices in neighboring piconets are scheduled to transmit or receive at the same time on the same frequency, the AA processing can use the pertinent frequency channel quality information to determine how the antenna array should be used to reduce the interference between the two communications. At 75, the transmit/receive beamforming is used to perform the future communications which were identified at 73.

Figure 8:
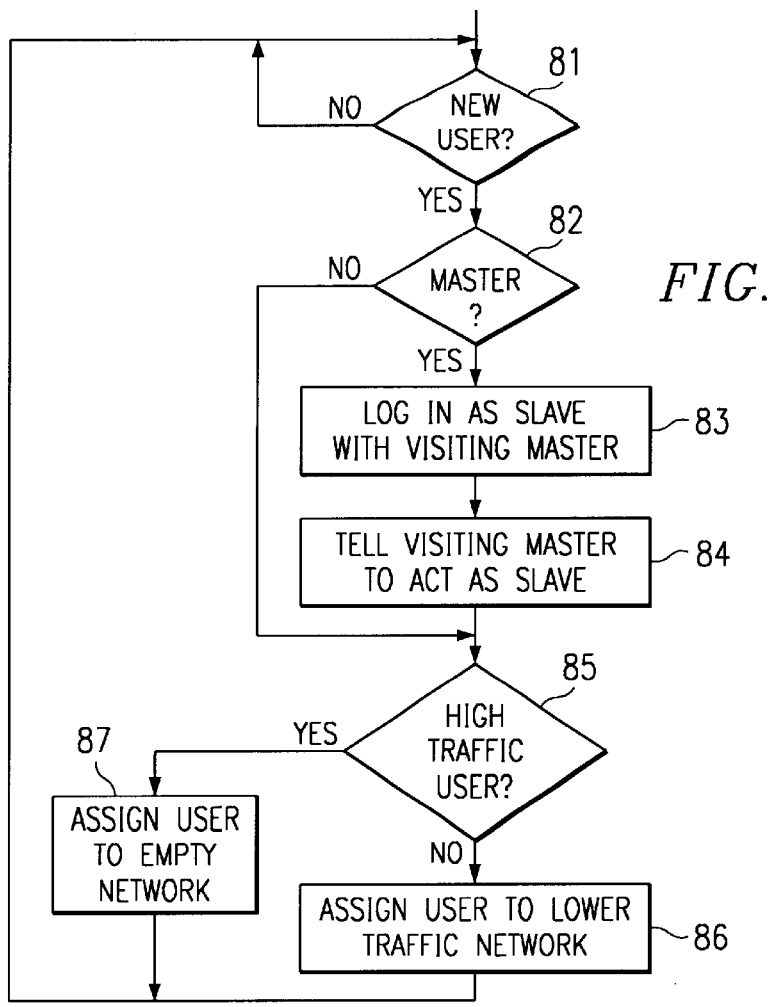
FIG. 8 illustrates exemplary operations which can be performed by concentrators according to the invention.

FIG. 8 illustrates exemplary operations which can be performed by the concentrator 11 when a new user enters its coverage area. After a new user is detected at 81, it is determined at 82 whether, for example, the new user is a master of its own Bluetooth piconet, for example a laptop computer. If not, it is then determined at 85 whether the new user is a high traffic user. If so, the high traffic user can be assigned to an empty network 15 (see also FIGS. 1 and 3). If the user is not a high traffic user at 85, then the user can be assigned at 86 to an existing network 15 which has a relatively low traffic load.

If it is determined at 82 that the new user is a master device (also referred to herein as a visiting master), then at 83 the concentrator logs in with the visiting master as a slave to the visiting master. After logging in as a slave at 83, the concentrator at 84 tells the visiting master to act as a slave while in the concentrator's coverage area. Thus, the concentrator becomes the master of the visiting master's piconet. Thereafter, the aforementioned operations at 85–87 can be performed with respect to the visiting master. The operational logic described above with respect to FIG. 8 can be controlled and driven, for example, by the wireless communication interface controller 23 of FIG. 2.

Figure 9:
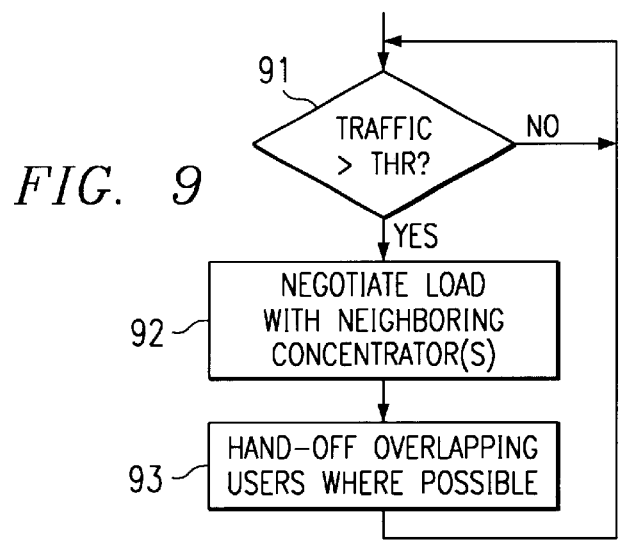
FIG. 9 illustrates exemplary operations which can be performed by concentrators according to the invention.

FIG. 9 illustrates further exemplary operations which can performed by the arrangement of FIG. 6. If it is determined at 91 that the traffic in a particular concentrator exceeds a threshold level THR, then the traffic load can be negotiated with one or more neighboring concentrators at 92. Thereafter at 93, users in one or more of the overlapping coverage areas associated with the neighboring concentrators can (if possible) be handed-off from the high traffic concentrator to the neighboring concentrator(s).

Figure 10:
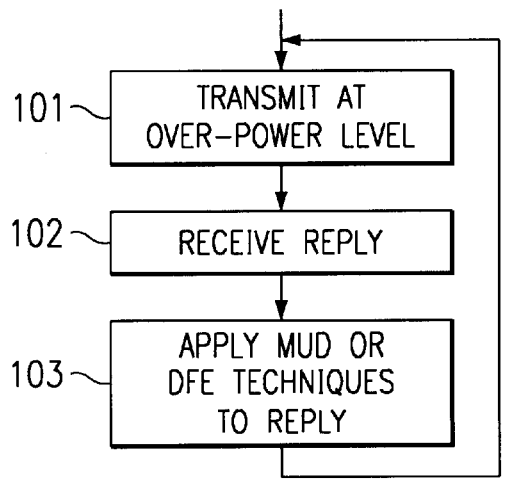
FIG. 10 illustrates exemplary operations which can be performed by concentrators according to the invention.

FIG. 10 illustrates further exemplary operations which can be performed by the concentrator 11. At 101, the concentrator transmits to one or more devices at a power level which exceeds the power limits of the applicable standard, for example the Bluetooth standard. At 102, a reply to the over-power transmission is received and, at 103, multi-user detection techniques or decision feedback equalization techniques can be applied to the reply in order to effectively enhance the receive range to correspond to the enhanced transmit range achieved by the over-power transmission at 101.

Figure 11:
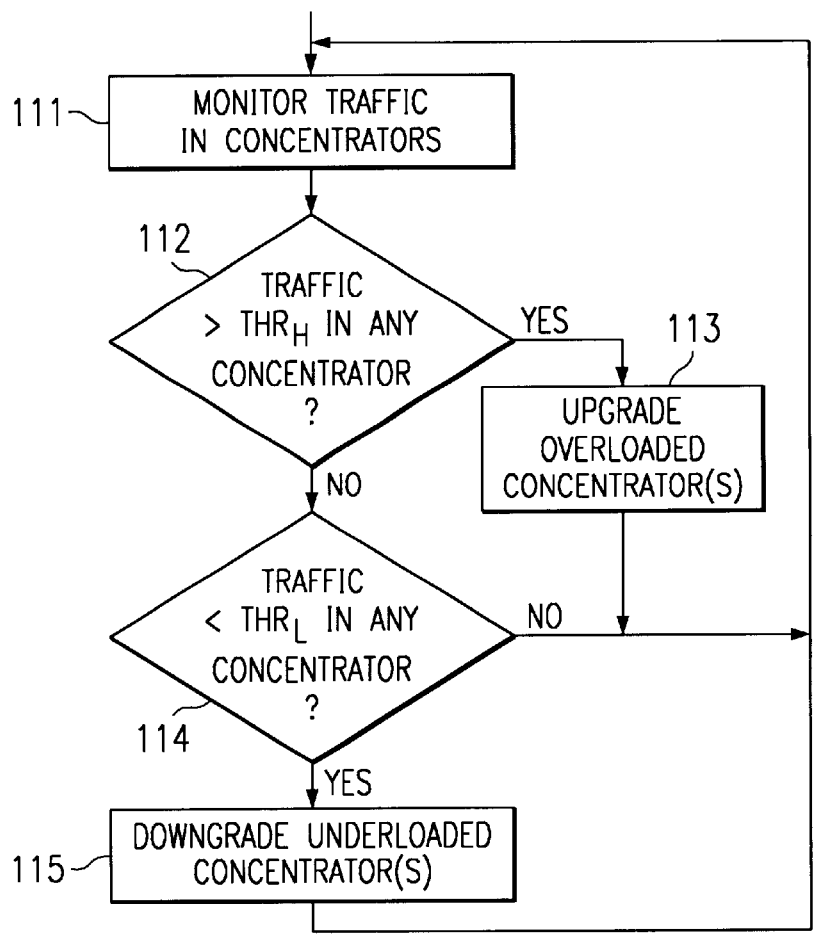
FIG. 11 illustrates exemplary operations which can be performed in connection with the exemplary concentrator arrangement of FIG. 6.

FIG. 11 illustrates exemplary operations which can be performed in conjunction with the arrangement of FIG. 6. At 111, the traffic in the concentrators is monitored. If it is determined at 112 that the traffic in any concentrator exceeds a threshold $THR_H$, then the overloaded concentrator(s) can be upgraded (e.g., replaced by a higher capacity concentrator) at 113. On the other hand, if none of the concentrators has a traffic level above the threshold at 112, it is determined at 114 whether any of the concentrators has a traffic load that is lower than a threshold $THR_L$. If so, then the underloaded concentrator(s) can be downgraded (e.g., replaced by a lower capacity concentrator) at 115.

A concentrator according to the invention can be used, for example when there are M users in a single room, for example a conference room. The concentrator can divide the M users into N separate networks (e.g., Bluetooth piconets) where N is less than or equal to M. The users in each of the networks will be unaware of the other networks and, due to the AA processing and beamforming of the concentrator, will avoid interference from the users in the other networks. In both a physical layer and a protocol layer sense, each of the networks will function as though it were the only network in the room. Thus, each of the networks can operate at a capacity close to the maximum capacity available to a single network. For example, in a Bluetooth system, the throughput provided by the concentrator would be approximately equal to N times the Bluetooth maximum capacity.

In another exemplary use of concentrators according to the invention, consider a cubicle farm. In this example, each cubicle can be considered as one of the networks 15 in FIG. 1, in order to allow the mouse, PC, monitor, etc. to be connected. If a given cubicle has high traffic, the concentrator can split that cubicle into two networks, for example by assigning a new (empty) network as the second network for that cubicle. High traffic devices, for example printers, may be placed in a network by themselves. Devices wandering into and out of the concentrator's coverage area can be assigned to the network with the lowest observed traffic. The concentrator's access to traffic information from all of the networks in its coverage area permits the concentrator to manage the network loading efficiently.

Thus, use of a concentrator according to the invention can delay the implementation of a true wireless LAN in favor of, for example, a Bluetooth-based network, by providing sufficient overall capacity and lower latency. A Bluetooth network is preferred under these conditions, because all devices will be immediately enabled for it (hence, apart from the concentrator, the cost is zero), and a new or temporary device (such as a laptop or cellular telephone of a visitor) can immediately join the network for information transfer. By thusly coordinating the devices within its coverage area, the concentrator acts like a cellular base station which coordinates the devices within its cell. It is also possible for two neighboring concentrators to communicate such that a device in, for example, the overlapping coverage areas of FIG. 6, can obtain a diversity advantage by communicating with both of the neighboring concentrators.

Concentrators according to the invention can be provided in all shapes and sizes. For example, a simple concentrator according to the invention can be a modified Bluetooth device connected to a wired LAN. The number of antennas and the sophistication of the antenna array processor 21 and the receive enhancer 41 will depend upon the traffic density. A concentrator can be placed physically close to its users in a convenient location, and can be simply switched on without requiring any elaborate pre-installation network loading studies. If it is determined later that the concentrator is underloaded or overloaded, that concentrator can then be replaced with a concentrator having the most appropriate capacity for long-term use. As traffic patterns in a given area change over time, the concentrator can again be upgraded or downgraded as appropriate.

It will be evident to workers in the art that inventive features of the concentrator embodiments described above with respect to FIGS. 1–11 can be implemented, for example, using a suitably programmed data processing device, for example a digital signal processor, or alternatively, by such a suitably programmed data processing device in combination with other hardware devices externally connected to the data processing device.

Although exemplary embodiments of the invention are described above in detail, this does not limit the scope of the invention, which can be practiced in a variety of embodiments.

What is claimed is:

1. An apparatus for coupling a plurality of local wireless communication networks for communication with a wired communication network, comprising:

a plurality of RF sections respectively coupled to a plurality of antennas for wireless communication with wireless communication devices operating in the local networks;

an antenna array processor coupled to said RF sections for performing antenna array processing relative to said antennas, a first group of said antennas responsive to said antenna array processor for performing wireless communications with a first wireless communication device operating in a first of the local networks, and a second group of said antennas responsive to said antenna array processor for performing wireless communications with a second wireless communication device operating in a second of the local networks, wherein the second device is different from the first device and the second network is different from the first network; and said antenna array processor having a communication port for coupling to the wired network to permit communication between the wired network and the devices operating in the local networks.

2. The apparatus of claim 1, wherein the first and second groups of antennas include the same antennas.

3. The apparatus of claim 1, wherein said RF sections are Bluetooth RF sections, the wireless communication devices are Bluetooth devices, and the local networks are Bluetooth piconets.

4. The apparatus of claim 3, including a controller coupled to said antenna array processor and cooperable therewith for causing said apparatus to appear as a Bluetooth master device simultaneously in each of the Bluetooth piconets.

5. The apparatus of claim 1, including a receive enhancer coupled to said antenna array processor for permitting communications received from the devices in the local networks to be of lower quality than would otherwise be required without said receive enhancer.

6. The apparatus of claim 5, wherein said receive enhancer includes a decision feedback equalizer.

7. The apparatus of claim 5, wherein said receive enhancer includes a multiuser detector.

8. The apparatus of claim 1, including a traffic monitor coupled to said antenna array processor for monitoring communication traffic, said traffic monitor including an output for negotiating with another apparatus to hand-off to said another apparatus at least one of the wireless communication devices currently operating in the local networks such that the at least one wireless communication device can be coupled via said another apparatus for communication with the wired communication network.

9. The apparatus of claim 1, wherein said first and second groups of antennas are responsive to said antenna array processor for beamforming during said wireless communications with the first and second wireless communication devices.

10. The apparatus of claim 1, wherein at least some of said RF sections support RF communications on at least two frequencies simultaneously.

11. A method for coupling a plurality of local wireless communication networks for communication with a wired communication network, comprising:

using antenna array processing to control a plurality of antennas such that a first group of the antennas performs wireless communications with a first wireless communication device operating in a first of the local networks and a second group of the antennas performs wireless communications with a second wireless communication device operating in a second of the local networks, wherein the second device is different from the first device and the second network is different from the first network; and coupling the wired network to the plurality of antennas to permit communication between the wired network and the devices operating in the local networks.

12. The method of claim 11, wherein the first and second groups of antennas include the same antennas.

13. The method of claim 11, wherein the wireless communication devices are Bluetooth devices and the local networks are Bluetooth piconets.

14. The method of claim 11, wherein said using step includes receiving wireless communications from the first and second devices, and deriving channel quality information from the received communications.

15. The method of claim 14, wherein said using step includes, responsive to the channel quality information, controlling the first and second groups of antennas for beamforming during said wireless communications with the first and second wireless communication devices.

16. The method of claim 11, wherein said using step includes controlling the first and second groups of antennas for beamforming during said wireless communications with the first and second wireless communication devices.

17. The method of claim 11, including using at least some of the antennas on at least two frequencies simultaneously for wireless communications with devices operating in the local networks.

18. The method of claim 11, including using one of decision feedback equalizer techniques and multi-user detection techniques for permitting communications received from the devices in the local networks to be of lower quality than would otherwise be required without using said techniques.

19. The method of claim 18, including increasing a transmission power level of the first and second groups of antennas in conjunction with said step of using one of decision feedback equalizer techniques and multi-user detection techniques.

20. The method of claim 11, including requiring all of the wireless communication devices operating in the local wireless communication networks to operate as slave devices in their associated networks, and further including detecting that a wireless communication device is visiting one of the local wireless communication networks and is operating therein as a master device, and logging in as a slave device with the visiting device that is operating as a master device and instructing the visiting device to operate as a slave device while visiting in the local wireless communication network.

* * * * *